United States Patent [19]
Johnson

[11] 3,976,121
[45] Aug. 24, 1976

[54] DETECTION APPARATUS

[75] Inventor: Martin Stanley Johnson, Leeds, England

[73] Assignee: Marston Radiators Limited, Yorkshire, England

[22] Filed: Nov. 18, 1974

[21] Appl. No.: 524,945

[30] Foreign Application Priority Data
Nov. 30, 1973 United Kingdom............... 55658/73

[52] U.S. Cl............................... 165/11; 123/41.15; 340/59
[51] Int. Cl.² ........................................ F28F 19/00
[58] Field of Search...................... 123/41.15, 41.03; 165/11; 340/59, 244 A, 244 B

[56] References Cited
UNITED STATES PATENTS

| | | | |
|---|---|---|---|
| 2,327,558 | 8/1943 | Reavis............................ | 123/41.15 |
| 3,230,770 | 1/1966 | Hermanson...................... | 73/304 C |
| 3,495,214 | 2/1970 | Wishart.............................. | 340/59 |
| 3,603,926 | 9/1971 | Kimura.............................. | 340/59 |
| 3,805,230 | 4/1974 | Sakasegawa et al............ | 340/244 A |
| 3,832,982 | 9/1974 | Guehr............................. | 123/41.15 |
| 3,845,464 | 10/1974 | Engel................................ | 340/59 |

Primary Examiner—Albert W. Davis, Jr.
Assistant Examiner—James D. Liles
Attorney, Agent, or Firm—Cushman, Darby & Cushman

[57] ABSTRACT

A conductivity probe unit comprising a chamber with a restricted entrance and an internal button electrode, the chamber being located in the header tank of a radiator.

13 Claims, 6 Drawing Figures

3,976,121

DETECTION APPARATUS

BACKGROUND OF THE INVENTION

This invention relates to detection apparatus and has particular, but not exclusive, reference to conductivity probes for use in radiators.

With the tendency for motor vehicle engines to become more powerful, the water cooling system used to cool the engines have had to become more efficient and more reliable. With modern engines, a sudden loss of coolant can rapidly give overheating conditions which can lead to distortion and even destruction of the engine. It has been proposed, therefore, to have detection apparatus to detect the coolant water level so that a warning of a low water level can be given to the vehicle driver. Conventionally, these detectors have worked by having a probe which has a part of its length in the water and which is otherwise insulated from the body of the radiator. The coolant establishes an electrical path between the probe and the radiator and this electrical path is monitored to indicate the presence of coolant water. Once the coolant level drops below the level of the probe, the electrical path is broken and this can be detected and used to give a warning to the driver.

It has been discovered, however, that certain types of radiators, and particularly cross-flow radiators, can have their header tanks full of froth even when the water level is below that which would normally cause the detection apparatus to indicate a low water level. This froth is normally created by the water pump which circulates the water through the engine and radiator and the froth can provide a sufficiently conducting electrical path between the probe and the radiator so that no warning is given to the driver. The froth does not, however, act as an efficient coolant and overheating and possible damage to the engine can occur without the driver being aware of the loss of coolant.

SUMMARY OF THE INVENTION

By the present invention there is provided a radiator having a core and a header tank, the header tank incorporating a conductivity probe unit comprising a chamber of an electrically insulating material secured to the header tank, the chamber having a restricted communication with the interior of the header tank, and the chamber containing a conductivity probe connectable, in use, to an elecrical detection circuit.

The electrode may be a button electrode sealed into the wall of the chamber and communicating through the wall with the exterior of the radiator. The electrode may be of brass and may be rivetted to the chamber. There may be a resilient seal between the chamber wall and the electrode.

The restricted communication may be by means of a foraminate obturating member. The member may be an apertured disc. There may be two apertures located, in use, one above the other. The two apertures may have a size in the range ⅛ inch to 3/16 inch diameter. The member may be of brass.

The insulating material may be a plastics material such as polytetrafluoroethylene. The chamber may be cup-shaped and may be screwed into the header tank. The header tank may have a threaded bush secured into it, for example by soldering, and the cup-shaped member may be screwed into the bush. There may be a sealing washer between the bush and the cup-shaped member. The cup-shaped member may have at least one pair of opposed flats on its exterior surface to accommodate a spanner for screwing the cup-shaped member into the header tank or bush.

BRIEF DESCRIPTION OF THE DRAWINGS

By way of example, embodiments of the present invention will now be described with reference to the accompanying drawings, of which.

DESCRIPTION OF THE PREFERRED EMBODIMENTS

Figure 1:
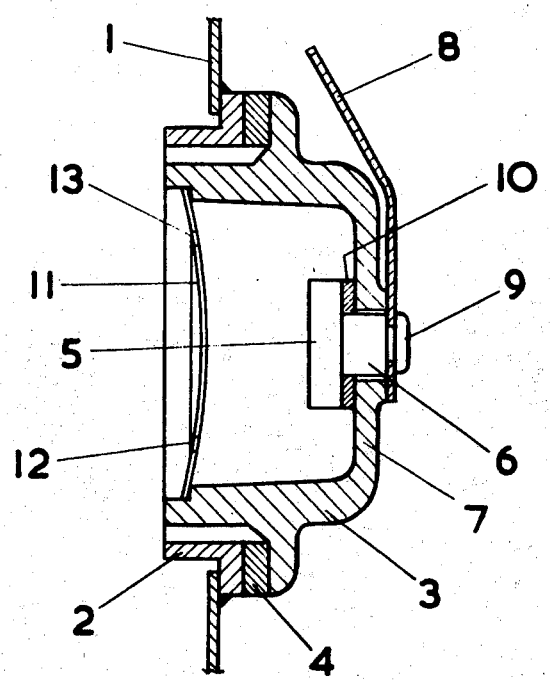
FIG. 1 is a cross-sectional view of a conductivity probe unit.
Figure 2:
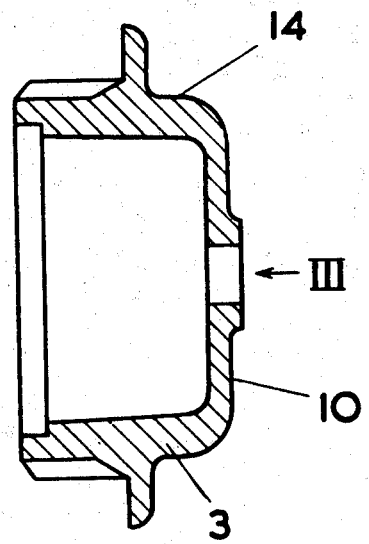
FIG. 2 is an enlarged cross-sectional view of the chamber of FIG. 1.
Figure 6:
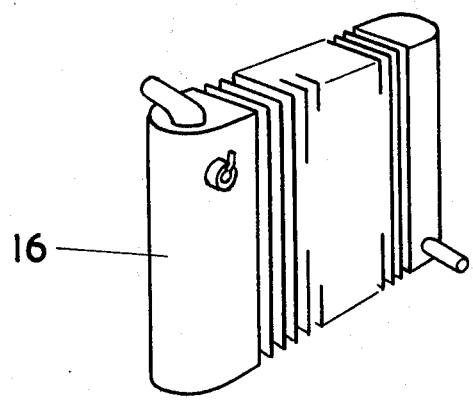
FIG. 6 is a perspective view of a crossflow radiator.

Referring to FIG. 1, a wall 1 is a part of the header tank 16 of the radiator shown in FIG. 6. This radiator is a crossflow radiator, ie one in which the header tanks are on opposing sides of the radiator core, and coolant liquid passes from one tank to the other across the core. The header tank has soldered to it a flange threaded brass bush 2. Screwed into the bush 2 is a polytetrafluoroethylene chamber 3, there being a neoprene washer 4 between the bush and the chamber. The chamber contains a button electrode 5 which is formed of brass. The button electrode has a head which is located inside the chamber and a shank 6 which passes through the end wall 7 of the chamber; the shank also passes through a brass contact strip 8 and is rivetted thereto as at 9. A neoprene washer 10 is located between the head of the electrode and the end wall to form a water-tight seal.

Figure 3:
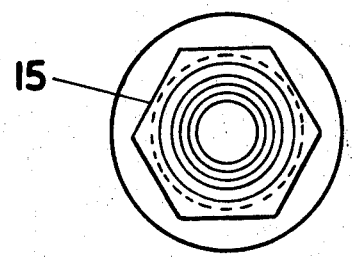
FIG. 3 is a view along the arrow III of FIG. 2.
Figure 4:
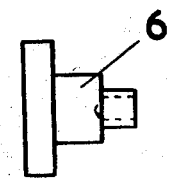
FIG. 4 is an enlarged side elevational view of an electrode.

The mouth of the chamber contains a brass disc 11 in which there are two apertures 12 and 13. The apertures have a diameter in the range ⅛ inch to 3/16 inch. The outside wall 14 of the chamber has a hexagonal shape as shown clearly in FIG. 3, which enables the chamber to be screwed into the threaded bush 2.

In use, the header tank 1 and the contact strip 8 are connected to an electrical detection circuit which detects an electrical conducting path between the button electrode 5 and the header tank 1 through the coolant which normally fills the header tank and the interior of the chamber 3. The coolant can pass through the apertures 12 and 13 to establish the electrical conducting path.

In the event of a simple loss of coolant lowering the coolant level below the level of the electrode 5, the elctrical path is interrupted and this can be detected and a suitable warning given to the driver of the motor vehicle incorporating the radiator. In the event of the header tank becoming full of froth, the apertures 12 and 13 act as a barrier to the froth and as a result, the button electrode 5 is interrupted electrically from the header tank 1 and the detection circuit will then operate to indicate loss of coolant.

Alternative forms of the disc 11 can be used including a mesh or an apertured screen or other foraminate structure.

Figure 5:
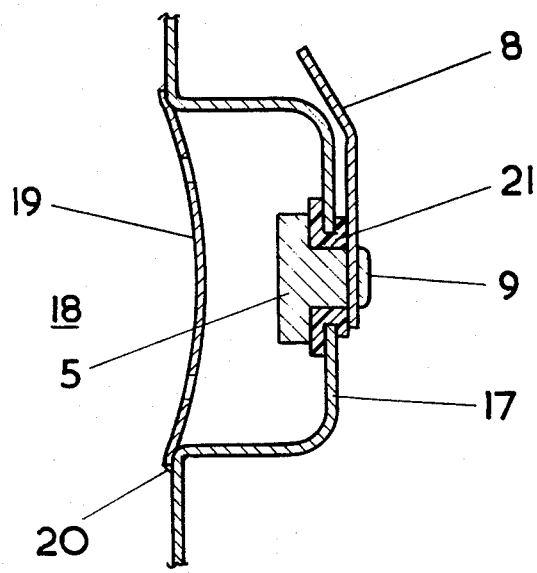
FIG. 5 is a cross-sectional view of a chamber integral with a header tank.

The chamber may be formed integrally with the header tank as is shown in FIG. 5. In the case, the chamber 17 is separated from the remainder of the header tank 18 by means of a disc 19 brazed at 20 across the face of the chamber. The electrode assembly is similar to that described with reference to FIG. 1 except for the insulating washer 21 which insulates the electrode 5 from the chamber 17. This washer is necessary if the chamber and header tank are formed of a conducting material such as brass but should the header tank and chamber be of an insulating material, then the insulating washer 21 can be dispensed with and a simple washer such as is used in FIG. 1 will suffice.

Other materials than brass and polytetrafluoroethylene may be used, such as stainless steel for the electrode.

I claim:

1. A system for detecting liquid level changes in a motor vehicle cooling circuit containing an aqueous solution susceptible to formation of electrically-conducting froth, said system including a radiator having a core and a header tank, the header tank incorporating an electrical conductivity probe unit comprising a chamber containing an electrical probe electrically insulated from the body of the header tank and connected to an electrical detection circuit, the chamber being in restricted liquid communication with the interior of the header tank through a froth barrier in the form of a foraminate obturating member so that said detection circuit is unaffected by froth which may be present in said header tank.

2. A radiator as claimed in claim 1 in which the chamber is integral with the header tank.

3. A radiator as claimed in claim 1 in which the chamber is of electrically insulating material.

4. A radiator as claimed in claim 3 in which the insulating material is a plastics material, preferably polytetrafluoroethylene.

5. A radiator as claimed in claim 1 in which the chamber is cup-shaped and is screwed into a threaded bush, the bush being secured to the header tank.

6. A radiator as claimed in claim 5 in which there is a sealing washer between the bush and the cup-shaped member.

7. A radiator as claimed in claim 5 in which the cup-shaped member has at least one pair of opposed flats on its exterior surface.

8. A radiator as claimed in claim 1 in which the conductivity probe is a button electrode sealed into the wall of the chamber and communicating through the wall with the exterior of the chamber.

9. A radiator as claimed in claim 8 in which the electrode is brass and is rivetted to the chamber.

10. A radiator as claimed in claim 8 in which there is a resilient seal between the chamber wall and the electrode.

11. A radiator as claimed in claim 1 in which the obturating member is an apertured disc.

12. A radiator as claimed in claim 11 in which there are two apertures, located one above the other, the apertures having sizes in the range ⅛ inch diameter to 3/16 inch diameter.

13. A radiator as claimed in claim 1 which is a crossflow radiator.

* * * * *